United States Patent
Lofgren

(10) Patent No.: US 12,208,587 B2
(45) Date of Patent: Jan. 28, 2025

(54) WRAPPED TAPED BELT

(71) Applicant: ContiTech Deutschland GmbH, Hannover (DE)

(72) Inventor: Jeffery Lofgren, Lincoln, NE (US)

(73) Assignee: ContiTech Deutschland GmbH, Hannover (DE)

( * ) Notice: Subject to any disclaimer, the term of this patent is extended or adjusted under 35 U.S.C. 154(b) by 495 days.

(21) Appl. No.: 17/305,182

(22) Filed: Jul. 1, 2021

(65) Prior Publication Data

US 2023/0001655 A1    Jan. 5, 2023

(51) Int. Cl.

| | |
|---|---|
| *B29D 29/08* | (2006.01) |
| *B29D 29/10* | (2006.01) |
| *F16G 1/08* | (2006.01) |
| *F16G 1/28* | (2006.01) |
| *F16G 5/06* | (2006.01) |
| *F16G 5/20* | (2006.01) |

(52) U.S. Cl.
CPC ............ *B29D 29/08* (2013.01); *B29D 29/10* (2013.01); *B29D 29/103* (2013.01); *B29D 29/106* (2013.01); *F16G 1/08* (2013.01); *F16G 1/28* (2013.01); *F16G 5/06* (2013.01); *F16G 5/20* (2013.01)

(58) Field of Classification Search
None
See application file for complete search history.

(56) References Cited

U.S. PATENT DOCUMENTS

| | | | |
|---|---|---|---|
| 2,336,084 A | * | 12/1943 | Freedlander ........... B29D 29/10 156/190 |
| 5,610,217 A | | 3/1997 | Yarnell et al. |
| 6,419,775 B1 | | 7/2002 | Gibson et al. |
| 6,607,828 B1 | | 8/2003 | Hasaka |

(Continued)

FOREIGN PATENT DOCUMENTS

| | | |
|---|---|---|
| DE | 19963304 A1 | 6/2000 |
| EP | 0892007 A2 | 1/1999 |

(Continued)

OTHER PUBLICATIONS

International Search Report dated Sep. 29, 2022 of International Application PCT/EP2022/064378 on which claim priority this application.

*Primary Examiner* — Jacob T Minskey
*Assistant Examiner* — Adrianna N Konves
(74) *Attorney, Agent, or Firm* — Richard A. Wolf; Gregory Adams

(57) ABSTRACT

Methods of manufacturing a belt include, at least, laying up a plurality of cords of a belt build on a mandrel, laying up a tape adhesive on an inner surface of the plurality of cords, laying up a cushion layer on an opposing side of the tape adhesive, and vulcanizing the belt build in a profile-forming mold, where the tape adhesive is a vulcanizable rubber which is devoid carbon black. The methods may further include laying up an outer tape adhesive before the laying up of the plurality of cords, and in some aspects, tension layer is laid up before laying up the outer tape adhesive. In some other methods, the tension layer is laid up before the laying up of the plurality of cords. The methods may further include partially or fully wrapping the belt with a belt wrap prior to vulcanizing the belt.

8 Claims, 4 Drawing Sheets

(56) References Cited

U.S. PATENT DOCUMENTS

| | | |
|---|---|---|
| 6,616,558 B2 | 9/2003 | South |
| 6,641,905 B1 | 11/2003 | Fujimoto et al. |
| 6,863,761 B2 | 3/2005 | Knutson |
| 7,025,699 B2 | 4/2006 | Beck |
| 7,137,918 B2 | 11/2006 | Nonnast et al. |
| 7,358,294 B2 | 4/2008 | Buckmann et al. |
| 7,842,354 B2 | 11/2010 | Wood et al. |
| 8,142,316 B2 | 3/2012 | Goettsch et al. |
| 8,357,065 B2 | 1/2013 | Duke, Jr. et al. |
| 8,568,260 B2 | 10/2013 | Baldovino et al. |
| 8,632,650 B2 | 1/2014 | Mori et al. |
| 8,888,635 B2 | 11/2014 | Mori et al. |
| 10,220,545 B2 | 3/2019 | Lofgren |
| 2001/0039226 A1 | 11/2001 | Ito |
| 2001/0055667 A1 | 12/2001 | Kinoshita et al. |
| 2002/0132692 A1 | 9/2002 | Knutson |
| 2006/0204763 A1 | 9/2006 | Hartman et al. |
| 2008/0261739 A1 | 10/2008 | Kanzow et al. |
| 2009/0142572 A1 | 6/2009 | Burlett |
| 2009/0227406 A1 | 9/2009 | Wu et al. |
| 2009/0291796 A1 | 11/2009 | Mitsutomi et al. |
| 2010/0167860 A1 | 7/2010 | Mori et al. |
| 2010/0173740 A1 | 7/2010 | Mori et al. |
| 2011/0129647 A1 | 6/2011 | Duke, Jr. et al. |
| 2012/0309573 A1 | 12/2012 | Well et al. |
| 2015/0148165 A1 | 5/2015 | Matsuda |
| 2015/0225893 A1 | 8/2015 | Shimamura et al. |
| 2017/0145627 A1 | 5/2017 | Sakurai et al. |
| 2018/0154597 A1 | 6/2018 | Greydanus et al. |
| 2020/0391459 A1* | 12/2020 | Okamoto ............ B29C 43/3642 |

FOREIGN PATENT DOCUMENTS

| | | |
|---|---|---|
| EP | 1350055 A2 | 10/2003 |
| EP | 2871387 A1 | 5/2015 |
| EP | 2899217 A1 | 7/2015 |
| JP | 2006089877 A | 4/2006 |
| WO | 2009085587 A1 | 7/2009 |

* cited by examiner

WRAPPED TAPED BELT

FIELD

The field to which the disclosure generally relates is methods for producing power transmission belts, as well as the resulting belt, and more particularly, methods of manufacturing belts with one or more tape adhesives.

BACKGROUND

This section provides background information to facilitate a better understanding of the various aspects of the disclosure. It should be understood that the statements in this section of this document are to be read in this light, and not as admissions of prior art.

In conventional power transmission belts, the belt has an inner compression section, an outer tension section, and an intermediate neutral plane. Typically, helically wound reinforcing cords are located within the neutral plane and so the neutral plane is commonly referred to as the load carrying zone. Such belts have a variety of groove and rib configurations, using longitudinal or transverse grooves/ribs or a combination of both. The grooves are often located in the inner compression section of the belt. The grooves assist in engaging a pulley, or other drive, in the power transmission system. For some belts, grooves and rib configurations may also be provided in the outer tension section.

The generation of adhesion between the reinforcing cords and rubber compounds within the neutral plane and adjacent thereto, in dynamic products such as belts, tires, couplings, or hose is fundamental to their proper operation. Without sufficient adhesion, the product will fail to perform under dynamic conditions. Typically used adhesive system include many components or layers beginning with a fiber sizing applied to the fibers as they are spun, a primer typically applied to a yarn or greige cord or fabric or other fibrous reinforcement, an adhesive applied to and/or within the cord, and an overcoat applied to the treated cord bundle (or other fibrous reinforcement) to ensure compatibility with the surrounding rubber compound. The treated cords may finally be embedded in or surrounded by an adhesive or gum type rubber composition generally formed from one or more rubber plies or layers making up the body of the belt or other dynamic rubber product.

A conventional treatment for reinforcing cords consists of three coatings: 1) a primer treatment of isocyanate or epoxy in organic solvent; 2) a resorcinol-formaldehyde-latex ("RFL") treatment; and 3) a conventional overcoat adhesive based on a complex blend of chlorinated polymers, curatives, crosslinkers, adhesion promoters, film-formers, and/or acid scavengers, and the like. In some cases, a variation used for aramid cord includes a first polyurethane treatment based on hydroxyl- or epoxy-terminated liquid rubber and isocyanate-terminated liquid rubber, either of which may be a diene rubber, followed by a conventional RFL treatment. Presumably, an overcoat adhesive would also be needed for many applications, such as for bonding to ethylene-alpha-olefin rubber compounds. These are a complex series of treatments that are expensive, may involve use of some volatile components, and require optimization for best performance.

Thus, there is a need for improved belt manufacturing methods which address the above described problems and complications, and such needs are met, at least in part, with embodiments according to this disclosure.

SUMMARY

This section provides a general summary of the disclosure, and is not a necessarily a comprehensive disclosure of its full scope or all of its features.

In a first aspect of the disclosure, methods of manufacturing a belt include, at least, laying up a plurality of cords of a belt build on a mandrel, laying up a tape adhesive on an inner surface of the plurality of cords, laying up a cushion layer on an opposing side of the tape adhesive, and vulcanizing the belt build in a profile-forming mold, where the tape adhesive is a vulcanizable rubber which is devoid carbon black. The methods may further include laying up an outer tape adhesive before the laying up of the plurality of cords, and in some aspects, tension layer is laid up before laying up the outer tape adhesive. In some other methods, the tension layer is laid up before the laying up of the plurality of cords. The methods may further include partially or fully wrapping the belt with a belt wrap prior to vulcanizing the belt. In some aspects, the vulcanizable rubber of the tape adhesive is a rubber like that used in the cushion layer, while in some other cases, the vulcanizable rubber of the tape adhesive is a rubber which is different from that used in the cushion layer.

According to another aspect of the disclosure, methods of manufacturing a belt include, at least laying up the outer tape adhesive of the belt build on the mandrel, laying up the plurality of cords on the outer tape adhesive, laying up the cushion layer on an opposing side of the plurality of cords, and vulcanizing the belt build in a profile-forming mold. Methods may further include laying up a tension layer before laying up outer tape adhesive.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
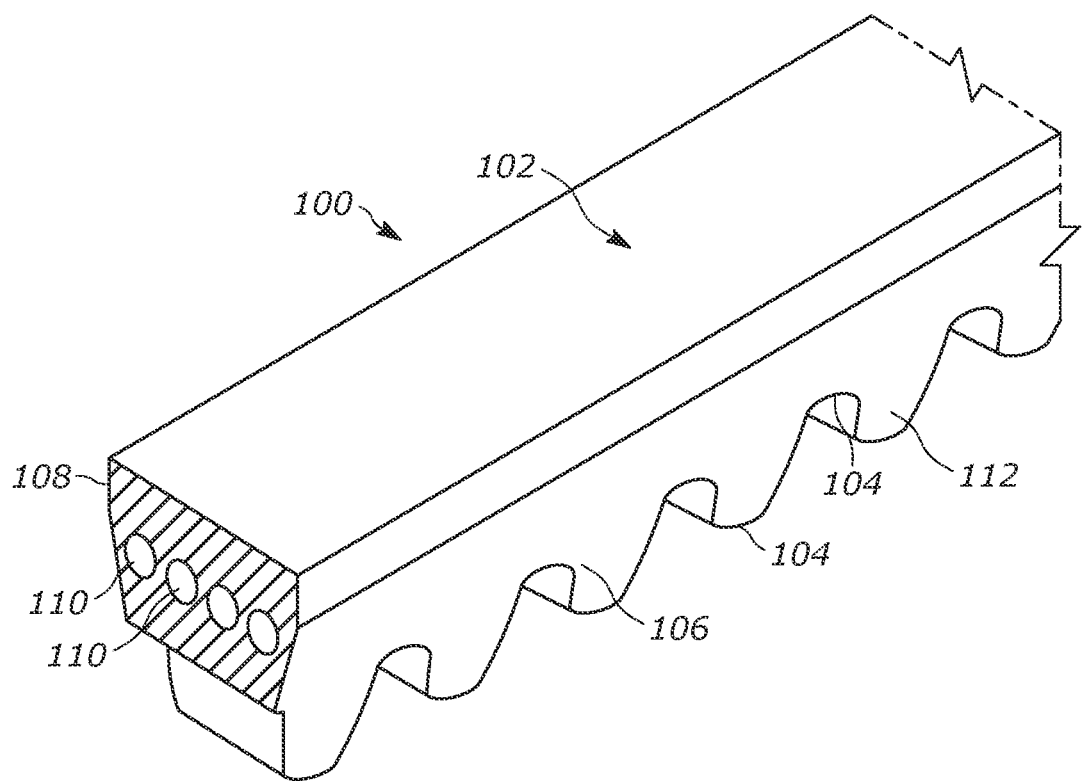
FIG. 1 is a fragmented perspective view, with parts in section, of a standard notched V-belt constructed in accordance with an embodiment of the disclosure.

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. While the compositions of the present disclosure are described herein as comprising certain materials, it should be understood that the composition could optionally comprise two or more chemically different materials. In addition, the composition can also comprise some components other than the ones already cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration or amount range or dimension listed or described as being useful, suitable, or the like, is intended that any and every concentration or amount or dimension within the range, including the end points, is to be considered as having been stated. For example, "a range of from 1 to 10" is to be read as indicating each and every possible value along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Embodiments according to the present disclosure are related to power transmission belts and methods of manufacturing such as well as components used therein. The belts contain components providing the belts with improved properties in regards to belt growth, wicking, abrasion, and durability. In some embodiments, the belts disclosed include a body portion, a tensile reinforcement layer having cords disposed within main body portion (which may contain components readily known to those in the art), and a contact portion positioned along the inner periphery of main body portion. In some embodiments, belts include a body portion having a tension section or backing or jacket, a cushion or compression section, a tensile reinforcement layer disposed within the body, and an optional fabric layer adhered to a drive surface. In some aspects, the belt may have an insulation layer located between the cushion section and the fabric layer to prevent or decrease rubber from the cushion section from permeating through the fabric to the drive surface. Some materials useful in preparing the tensile reinforcement layers include, but are limited to, tensile cords (also referred to as filaments, or tows), which may in some cases, be dipped in a water based urethane compound, then a RFL (resorcinol/formaldehyde/latex) material, followed by a rubber based overcoat, and such is disclosed in U.S. Pat. No. 10,220,545 B2, which is incorporated herein in its entirety by reference thereto.

Now referring to FIG. 1, where a standard notched V-belt 100 is illustrated therein. V-belt 100 includes an elastomeric body portion with a top surface 102 and tensile reinforcement layer in the form of a plurality of cords 110, where cords 110 are aligned longitudinally along the length of main body portion. Outward from the cords 110 is a tension portion layer or backing 108 of the V-belt elastomeric body.

The tensile reinforcement layer may also serve as load-carrying sections in embodiments of the disclosure. Tensile reinforcement layer is positioned within main body portion for providing support and strength to belt 100. It should be understood that, in general, any type of tensile reinforcement layer utilizing cords 110 known to the art may be utilized. Moreover, any desired material may be used as the cord 110 material, such as cotton, rayon, polyamide, polyester, aramid, steel, glass, carbon, PBO, polyketone, basalt, boron, and even discontinuous fibers oriented for low load carrying capability. In the embodiment of FIG. 1, as well as other embodiments of the disclosure, tensile reinforcement layer includes tensile cords 110 made from one or more yarns of high-modulus fiber, twisted or plied together into a cord and treated with the water based polyurethane treatment described herein. Some useful high-modulus fibers include those produced from aramid, fiberglass, nylon, polyester, cotton, steel, carbon fiber and polybenzoxazolepolyethylene naphthalate (PEN), poly(p-phenylene-2,6-benzobisoxazole) (PBO), basalt, boron, or liquid crystal polymer (LCP). In some embodiments, the cords 110 comprise aramid or carbon fiber. In some aspects, the cord may be a twisted filament yarn, or a twisted bundle of yarns of continuous carbon fiber filaments. The cords may also be in contact with an optional adhesive such as those described in U.S. Pat. No. 6,616,558 to South, the contents of which are hereby incorporated herein by reference.

V-belt 100 also includes bottom surface 104 positioned along the inner periphery of the main body. The bottom surface of V-belt 104 is in the form of alternating notch depression surfaces or troughs and projections thus forming belt teeth 112 orientated perpendicular to the longitudinal direction of the belt. These alternating notched depression surfaces and projections may follow a generally sinusoidal path as illustrated which serves to distribute and minimize bending stresses as the bottom surface 104 passes around pulleys and sheaves. Various notch profiles that deviate from sinusoidal in various ways are also useful. Included in the category of V-belts are those V-belts designed for continuously variable transmission ("CVT") applications, which often exhibit a belt body relatively wider than the belt thickness.

V-belt 100 further includes cushion portion 106 as a part of the V-belt elastomeric body. Cushion portion 106 extends into the belt teeth 112, adjacent cords 110, and inward from bottom surface 104. According to some aspects of the disclosure, a tape adhesive may be disposed between cushion portion 106 and cords 110, and/or between tension portion layer 108 and cords 110, during the manufacture of belt 100, as described in further detail in FIGS. 5A-5E.

Figure 2:
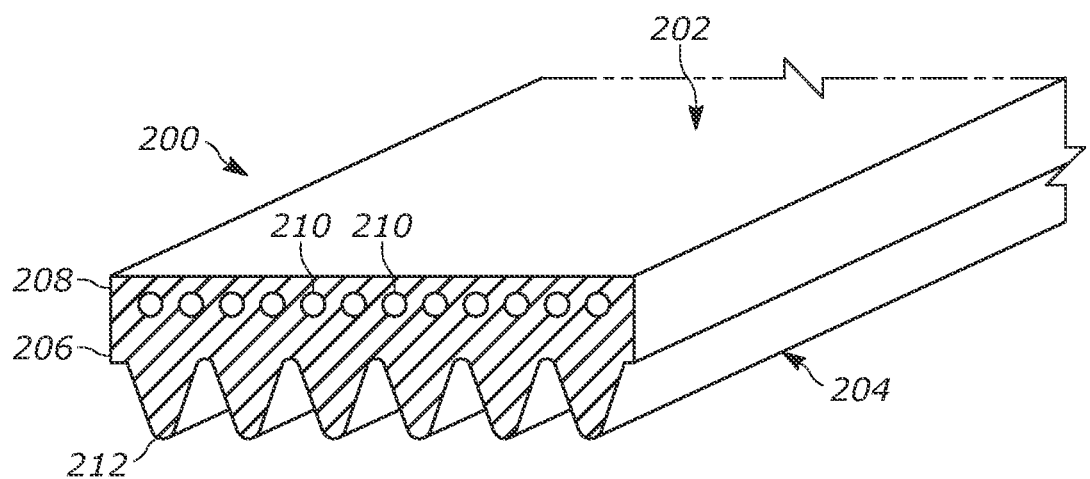
FIG. 2 is a fragmented perspective view, with parts in section, of a multi-V-ribbed belt constructed in accordance with an embodiment according to the disclosure.

Now referring to FIG. 2, where multi-V-ribbed belt 200 is illustrated. Multi-V-ribbed belt 200 includes main elastomeric body portion with top surface 202 as in the belt of FIG. 1, and also includes tensile reinforcement member in the form of cords 210, also as previously described. Longitudinally grooved sheave contact bottom surface 204 is in the form of a plurality of raised ribs, or apexes, 212 (six shown) alternating with a plurality of grooves having oppositely facing sides. In each of the instances of FIGS. 1 through 5, described herein above and below, sheave contact bottom surface, such as 204, may integral with main body portion, and may be formed from the same elastomeric material to be described in greater detail below, or layered of different material. The tensile reinforcement member cords 210, of belt 200 may be constructed from the same or similar materials as described above for FIG. 1, or any other suitable materials.

Multi-V-ribbed belt 200 further includes a tension portion layer or backing 208 disposed adjacent cords 210, as well as a cushion portion 206 as a part of the belt elastomeric body. Cushion portion 206 extends into the belt ribs 212, adjacent cords 210, and inward from bottom surface 204. According to some aspects of the disclosure, a tape adhesive may be disposed between cushion portion 206 and cords 210, and/or between tension portion layer 208 and cords 210, during the manufacture of belt 200, as described in further detail in FIGS. 5A-5E.

Figure 3:
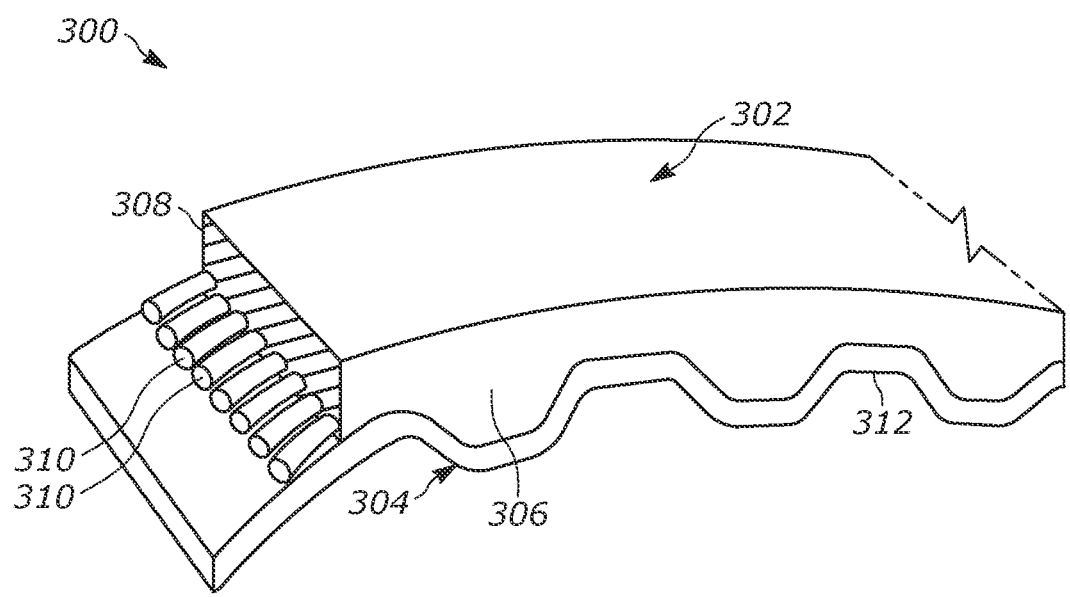
FIG. 3 is a fragmented perspective view, with parts in section, of a timing belt constructed in accordance with an embodiment according to the disclosure.

With reference to FIG. 3, another belt embodiment, 300, such as a timing belt, is illustrated. Belt 300 includes elastomeric main body portion having a top surface 302 and sheave contact bottom surface 304 positioned along the inner periphery of main body portion. This particular sheave contact bottom surface 304 is in the form of alternating transverse teeth and corresponding land portions which are designed to mesh with a transverse-grooved pulley or sprocket. Tensile reinforcement layer having cords 310 is positioned within main body portion for providing support and strength to belt 300. In the illustrated form, the tensile reinforcement layer tensile cords 310 are aligned longitudinally along the length of main body portion 302. The tensile reinforcement layer cords 310 of belt 300 may be constructed from the same materials as described above for FIG. 1.

Belt 300 further includes a tension portion layer 308 disposed adjacent cords 310, and cushion portion 306 as a part of the belt elastomeric body. Cushion portion 306 extends into the belt teeth, adjacent cords 310, and inward from bottom surface 304. According to some aspects of the disclosure, a tape adhesive may be disposed between cushion portion 306 and cords 310, and/or between tension portion layer 308 and cords 310, during the manufacture of belt 300, as described in further detail in FIGS. 5A-5E.

In some cases, a reinforcing fabric 312 may be utilized fittingly along the bottom surface 304 to form a face cover or tooth cover for the sheave contact portion. This fabric may be of any desired configuration such as a conventional weave consisting of warp and weft threads at any desired angle or may consist of warp threads held together by space pick cords, or of a knitted or braided configuration, or a nonwoven fabric, and the like. More than one ply of fabric may be employed, or combinations of different fabric types. If desired, fabric 312 may be cut on a bias so that the strands form an angle with the direction of travel of the belt. Conventional fabrics may be employed using such materials as cotton, polyester, polyamide, acrylic, aramid, polyketone, hemp, jute, fiberglass, and various other natural and synthetic fibers including blends or combinations thereof. In an embodiment of the disclosure, fabric layer 312 consists of an expansible wear-resistant fabric in which at least one of the warp or weft threads is made of nylon. In some cases, fabric layer 312 is made from a nylon 66 stretch fabric, and presents an elastomer-free (polyurethane/urea-free) surface for engaging cooperating drive sheaves. The elastomer-free surface may include a polymeric film laminated to the fabric. The fabric may also be treated with the water based polyurethane treatment described herein.

Figure 4:
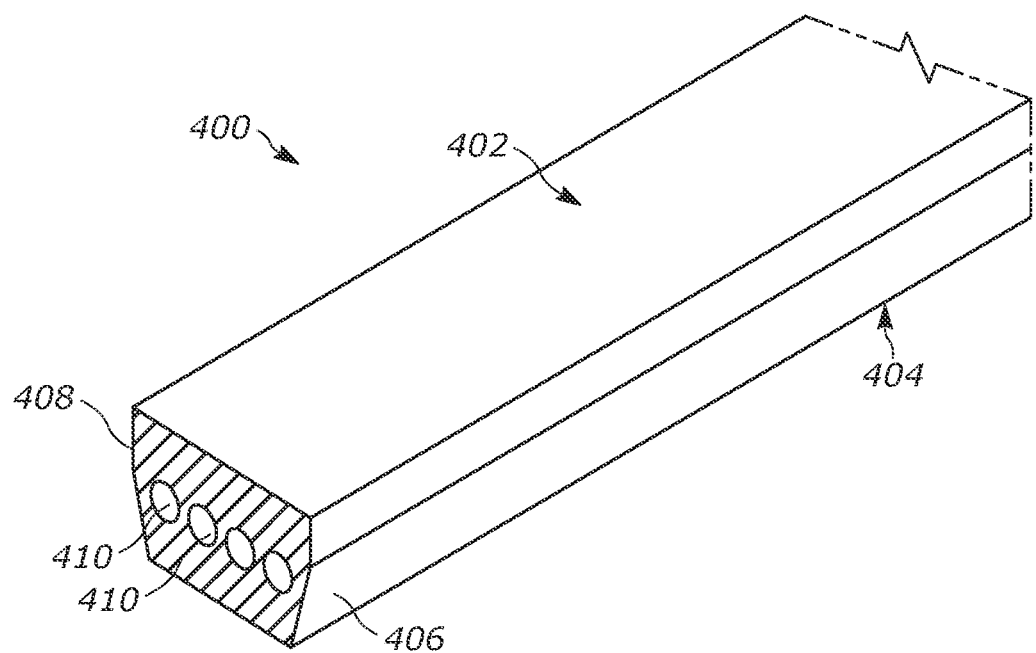
FIG. 4 is a fragmented perspective view, with parts in section, of a synchronous drive belt constructed in accordance with an embodiment according to the disclosure; and, FIGS. 5A through 5E are cross-section views, which illustrate some method embodiments for producing belts according to the disclosure.

FIG. 4 illustrates an endless power transmission belt 400. The belt 400 is particularly adapted to be used in associated sheaves in accordance with techniques known in the art. The belt is particularly suited for use in synchronous drive applications. The belt 400 may be adapted to be used in so-called torque sensing drives, application where shock loads of varying belt tension are imposed on the belt, applications where the belt is operated at variable speeds, applications where the belt is spring-loaded to control its tension and the like. Belt 400 includes a body having a tension portion or backing 408, a cushion, or compression, section 406, a tensile reinforcement layer disposed between the tension portion 402 and cushion portion 404, and an optional fabric layer adhered to a drive surface 404.

Belt 400 further includes cords 410, in the tensile reinforcement layer, which are disposed between tension portion layer 408 disposed and cushion portion 406 as a part of the belt elastomeric body. Cushion portion 406 is inward from the bottom surface 404. According to some aspects of the disclosure, a tape adhesive may be disposed between cushion portion 406 and cords 410, and/or between tension portion layer 408 and cords 410, during the manufacture of belt 400, as described in further detail in FIGS. 5A-5E. The tensile reinforcement layer cords 410 of belt 400 may be constructed from the same materials as described above for FIG. 1.

In the embodiment shown in FIG. 4, there is one drive surface 404 which may have a fabric layer. In accordance with other embodiments, the belt 400 may have multiple drive surfaces of two or more. A fabric layer may also be on the non-drive outer surface 402 of the belt. The fabric layer may be made from a woven, non-woven or knitted fabric. Some useful fabrics in accordance with the disclosure include conventional materials such as nylon (such as nylon 4, 6, nylon 6, 6 and nylon 6), cotton, polyester, cotton/polyester, nylon/polyester, cotton/nylon, Lycra™ (segmented polyurethane), aramid, rayon and the like. In some embodiments, the fabric is made of nylon 6, 6.

The elastomers for use in the tension section 402 and the compression section 404 may be the same or different. Conventional elastomers which may be used in one or both of these sections include natural rubber, polychloroprene, acrylonitrile-butadiene copolymers (NBR), polyisoprene, zinc salts of unsaturated carboxylic acid ester grafted hydrogenated nitrile butadiene elastomers, styrene-butadiene rubbers, polybutadiene, ethylene propylene diene monomer rubber (EPDM), hydrogenated acrylonitrile-butadiene copolymers (HNBR), polyurethane, and ethylene-acrylic elastomers. The insulation layer 410 may in some cases be a blend of an elastomer and a thermoplastic. The elastomer component of the insulation layer 410 is selected from conventional elastomers used in manufacturing belts and includes, but is not limited to, the list of elastomers set forth above in the discussion of elastomers for use in the tension section 402 and compression section 404 of the belt 400. Some suitable examples of the elastomers are butadiene copolymers such as polybutadiene, NBR, and HNBR.

In each of the embodiments illustrated in FIGS. 1 through 4 above, belt body portions may be formed of any conventional and/or suitable cured elastomer composition, and may be of the same as or different from that described below in relation to the optional adhesive rubber member comprising tensile reinforcement layers. Suitable elastomers that may be utilized for this purpose include for example polyurethane elastomers (including as well polyurethane/urea elastomers and so-called millable gums) (PU), polychloroprene rubber (CR), acrylonitrile butadiene rubber (NBR), hydrogenated NBR (HNBR), styrene-butadiene rubber (SBR), alkylated chlorosulfonated polyethylene (ACSM), polyepichlorohydrin, polybutadiene rubber (BR), natural rubber (NR), and ethylene alpha olefin elastomers such as ethylene propylene copolymers (EPM), ethylene propylene diene terpolymers (EPDM), ethylene octene copolymers (EOM), ethylene butene copolymers (EBM), ethylene octene terpolymers (EODM); and ethylene butene terpolymers (EBDM); ethylene vinylacetate elastomers (EVM); ethylene methylacrylate (EAM); and silicone rubber, or a combination of any two or more of the foregoing.

In preparing the elastomeric belt (or other articles) body portions, in accordance with some embodiments of the disclosure, the elastomer(s) may be blended with conventional rubber compounding ingredients including fillers, plasticizers, stabilizers, vulcanization agents/curatives and accelerators, in amounts conventionally employed; and, while the tape adhesives according to the disclosure is a vulcanizable rubber which is devoid carbon black, it may also be devoid of any one or more of these ingredients. When ethylene-alpha-olefin elastomer and diene elastomers such as HNBR are used in the elastomeric portions, one or more metal salts of alpha-beta organic acids may be employed in amounts now conventionally utilized to improve dynamic performance of the resultant article. Thus, zinc dimethacrylate and/or zinc diacrylate may be utilized in such compositions in amounts of from about 1 to about 50 pounds per hundred pounds of elastomer (phr); or alternatively of from about 5 to about 30 phr; or of from about 10 to about 25 phr. These materials furthermore contribute to the adhesiveness of the composition, and increase the overall cross-link density of the polymer upon curing with peroxide or related agents through ionic crosslinking. Further, any number of suitable compositions for utilization in or as the elastomeric portions of the rubber articles useful herein, may be used, and could be selected from elastomer compositions described for example in The R. T. Vanderbilt Rubber Handbook (13th ed., 1996), and in U.S. Pat. No. 5,610,217, the contents of which, are incorporated herein by reference. In an embodiment of the disclosure, associated with automotive accessory drive applications, the elastomeric belt body portions 12 may be formed, in some cases, of a suitable ethylene alpha olefin composition, such as an EPM, EPDM, EBM or EOM composition.

Any of the belt body portions may, in some aspects, include discontinuous fibers as is well known in the art, utilizing materials such as including but not limited to cotton, polyester, fiberglass, aramid and nylon, in such forms as staple or chopped fibers, flock or pulp, in amounts generally employed. In some embodiments, relating to profiled (e.g., as by cutting or grinding) multi-v-ribbed belts, such fiber loading is formed and arranged such that a substantial portion of the fibers are formed and arranged to lay in a direction generally transverse the direction of travel of the belt. In molded multi-v-ribbed belts and/or synchronous belts made according to flow through methods however, the fiber loading would generally lack the same degree of orientation.

The tape adhesives according to the disclosure, which are vulcanizable rubber devoid of at least carbon black, may be provided as a preform and thereafter laid up, or otherwise applied, during the belt build. A tape adhesive preform is different from the conventional adhesive applications which uses a solvated tackifying resin which is applied by spraying or dipping, followed by volatile solvent flash off. In some aspects, the tape adhesive preform is actually devoid of volatile solvent when applied in the belt build. Also, the tape adhesive preform(s) may be applied by an operator, a machine, or any other suitable technique. Further, the tape adhesive preform(s) could be provided as a double faced tape, and applied to the surface(s) that it is used for adherence onto.

Figure 5A:
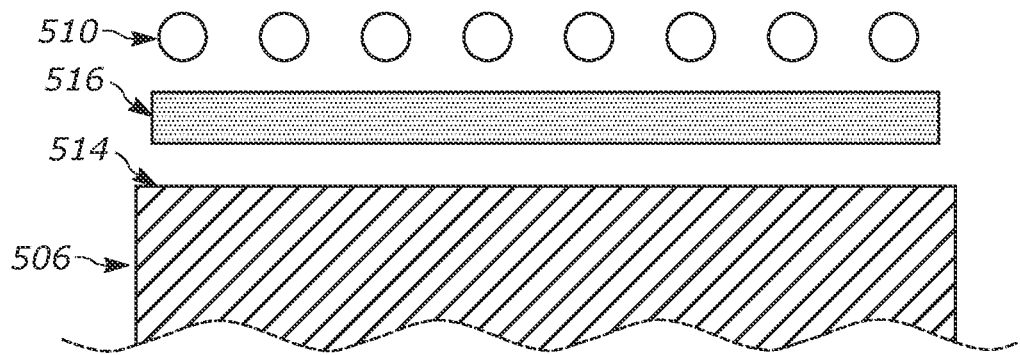

According to some aspects of the disclosure, the belts are built up on a mandrel in a series of layers before vulcanization. With reference to FIG. 5A, some methods of manufacturing a belt include laying up a plurality of cords 510 of a belt build on a mandrel, which may, or may not, already have a tension portion or layer or backing, laid upon the mandrel prior to the plurality of cords 510. Then a tape adhesive 516 is applied onto an inner surface of the plurality of cords 510. Thereafter a cushion layer 506 is laid on an opposing side of the tape adhesive 516 from the plurality of cords 510, and a cushion portion surface 514 is in matingly contact with tape adhesive 516. It is within the scope of this disclosure that the order could also be reverse, where the cushion layer 506 is first laid up, then the tape adhesive 516, and then cords 510. Thereafter, the belt build may be vulcanized in a profile-forming mold. In general, the tape adhesive 516 is based upon a vulcanizable rubber which is devoid carbon black, which may be the same as, or different from, other rubber materials composed in other portions of the belt.

Figure 5B:
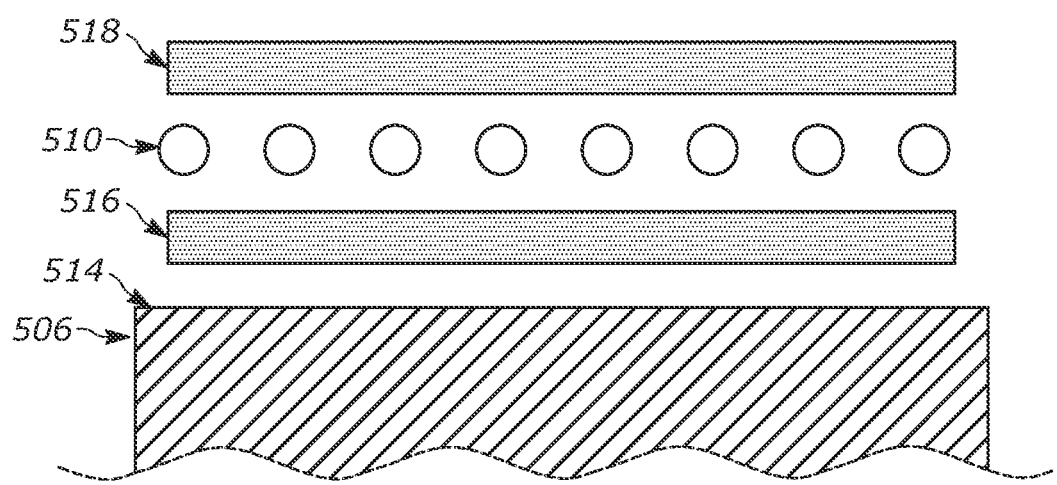

Now referencing FIG. 5B, which depicts some other methods of manufacturing a belt laying by up an outer tape adhesive 518 of a belt build on a mandrel, which may, or may not, already have a tension portion or layer or backing, laid upon the mandrel prior to the outer tape adhesive 518. The plurality of cords 510 are then applied onto applied onto outer tape adhesive 518, followed by a tape adhesive 516 applied onto an inner surface of the plurality of cords 510. Thereafter a cushion layer 506 is laid on an opposing side of the tape adhesive 516 from the plurality of cords 510, and a cushion portion surface 514 is in matingly contact with tape adhesive 516. It is within the scope of this disclosure that the order could also be reverse, where the cushion layer 506 is first laid up, then the tape adhesive 516, then cords 510, and then outer tape adhesive 518. Thereafter, the belt build may be vulcanized in a profile-forming mold. In general, just as is the case for tape adhesive 516, the outer tape adhesive 518 is based upon a vulcanizable rubber which is devoid carbon black, which may be the same as, or different from, other rubber materials composed in other portions of the belt.

Figure 5C:
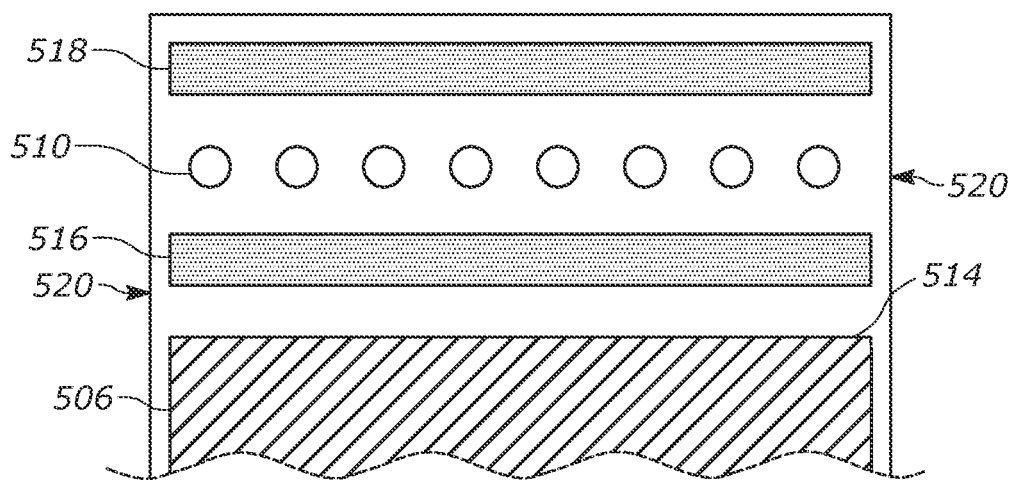

FIG. 5C, depicts some other methods of manufacturing a belt where provided are the cushion portion/layer 506, tape adhesive 516, cords 510, an optional outer tape adhesive 518 and an optional tension portion or layer or backing. According to these methods, a belt wrap 520 is applied at least partially around the belt, or even completely and fully around the belt. Any suitable belt wrap 520 material may used, including materials known to those with skill in the art. The belt wrap 520 may be applied prior to vulcanization of the belt.

Figure 5D:
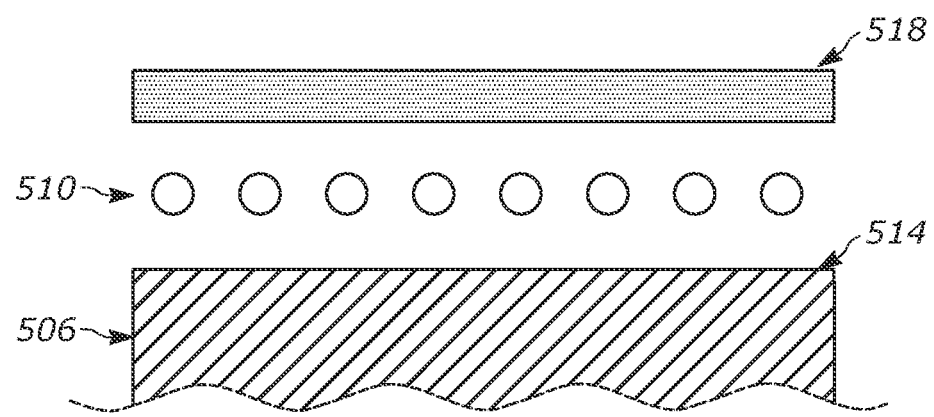

Now referencing FIG. 5D, which depicts yet some other methods of manufacturing a belt laying by up an outer tape adhesive 518 of a belt build on a mandrel, which may, or may not, already have a tension portion or layer or backing, laid upon the mandrel prior to the outer tape adhesive 518. The plurality of cords 510 are then applied onto applied onto outer tape adhesive 518. Thereafter a cushion layer 506 is laid on an opposing side of the plurality of cords 510, and a cushion portion surface 514 is in matingly contact with the plurality of cords 510. In these method embodiments, a tape adhesive 516 is not applied onto an inner surface of the plurality of cords 510. The order could also be reverse, where the cushion layer 506 is first laid up, then cords 510, and then outer tape adhesive 518. Thereafter, the belt build may be vulcanized in a profile-forming mold. A belt wrap 520 and tension portion or layer or backing may also be applied in these methods as well.

Figure 5E:
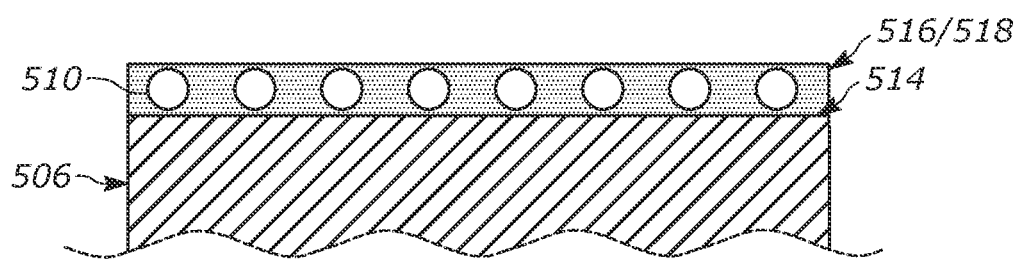

FIG. 5E, shows how the layers lay together in above described belt manufacturing methods from FIGS. 5A, 5B and 5D, prior to the belt vulcanization. Cords portion/layer 506, plurality of cords 510, and/or tape adhesive 516, and/or outer tape adhesive 518 and/or an optional outer tape adhesive 518 are arranged as shown. In some aspects the layers may be arranged in a contiguous manner, partially intermixed, or a combination of both a contiguous manner and partially intermixed manner.

In the vulcanization of the belt manufacturing methods, the belts are then subjected to curing pressures and temperatures sufficient to vulcanize and mold the belt, as is well known in the art. For example, the fabrication process may include evacuating the air from inside the mold, applying steam pressure on the outside shell to a range of about 175 to 235 psig (about 1.2 to 1.62 MPa) for about 2 to 10 minutes, then applying steam pressure on the inside of the mold to a range of about 85 to 210 psig (about 0.59 to 1.45 MPa), and curing for about 10 to 20 minutes. Once cooled, the cured belt build is then separated from the mandrel and cut to the appropriate belt widths. The optimum rib shapes may be achieved with process pressures on the high end of the range. Hydraulics or other methods known in the art (pneumatic, mechanical, and the like) can also be used to apply pressure to the belt, in conjunction with concurrently applied electric heat for curing in lieu of steam cure. The pressure range for a hydraulic cure may be about 85 to 500 psig (about 0.59 to 3.45 MPa). The temperature range may be about 250 to 500° F. (about 120 to 260° C.). This method of curing broadens the choice of rubber stocks to include many with relatively poor scorch safety and/or relatively high viscosity.

While some aspects of the disclosure are illustrated with reference to the embodiments shown in FIGS. 1-5E, it should be understood that the disclosure is not to be limited to these particular embodiments or forms as illustrated but rather is applicable to any belt construction within the scope of the claims as defined below. Further, embodiments may have the general form of the toothed belts described above, which is an endless belt, either as molded or by joining two belt ends together. In some other cases, embodiments may have two ends, which may be clamped to various associated mechanisms, for example, in conveying, transporting, holding, or positioning applications. Also, belts may be made by known methods, including continuous lamination methods that produce belts having two ends, instead of endless belts. The two ends may be joined according to known methods to make endless belts. Rubber belts may be built on a mandrel, cured, and cut to width according to methods known in the art.

It should be understood that tape adhesives according to embodiments of the invention may be used in various kinds of elastomeric composite articles, such as power transmission belts, transport or transfer belts, straps, tires, hose, air springs, vibration mounts, etc. Also, materials described in forming any of the embodiments illustrated, or components thereof, may be useful in any of the other embodiments and components illustrated, as deemed appropriate.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this

| List of reference numerals (part of the specification): | |
|---|---|
| 100 | V-belt |
| 102 | Top surface |
| 104 | Bottom surface |
| 106 | Cushion portion/layer |
| 108 | Tension portion/layer or backing |
| 110 | Cords |
| 112 | Belt teeth |
| 200 | Multi-V-ribbed belt |
| 202 | Top surface |
| 204 | Bottom surface |
| 206 | Cushion portion/layer |
| 208 | Tension portion/layer or backing |
| 210 | Cords |
| 212 | Belt ribs |
| 300 | Timing belt |
| 302 | Top surface |
| 304 | Bottom surface |
| 306 | Cushion portion/layer |
| 308 | Tension portion/layer or backing |
| 310 | Cords |
| 312 | Fabric layer |
| 400 | Flat belt |
| 402 | Top surface |
| 404 | Bottom surface |
| 406 | Cushion portion/layer |
| 408 | Tension portion/layer or backing |
| 410 | Cord |
| 506 | Cushion portion/layer |
| 510 | Cords |
| 514 | Cushion portion/layer surface |
| 516 | Tape adhesive |
| 518 | Outer tape adhesive |
| 520 | Belt wrap |

What is claimed is:

1. A method of manufacturing a wrapped belt comprising:
laying up an un-vulcanized tension layer on a mandrel, the un-vulcanized tension layer being formed from a vulcanizable EPDM or HNBR rubber mixture;
laying up a first un-vulcanized tape overlying the un-vulcanized tension layer, the first un-vulcanized tape being formed from a vulcanizable EPDM or HNBR rubber mixture and having an adhesive surface that is not formed by solvated tackifying resin applied by spraying or dipping, the first un-vulcanized tape being laid up so that the adhesive surface faces away from the un-vulcanized tension layer;
laying up a plurality of cords on the adhesive surface of the first un-vulcanized tape adhesive;
laying up a second un-vulcanized tape on an opposite side of the plurality of cords relative to the first un-vulcanized tape adhesive, the second un-vulcanized tape being formed from a vulcanizable EPDM or HNBR rubber mixture and having an adhesive surface that is not formed by solvated tackifying resin applied by spraying or dipping, the second un-vulcanized tape being laid up so that the adhesive surface faces toward the plurality of cords;
laying up an un-vulcanized cushion layer overlying the second un-vulcanized tape on a side of the second un-vulcanized tape opposite the plurality of cords to thereby form a partially-complete un-vulcanized belt build, the un-vulcanized cushion layer being formed from a vulcanizable EPDM or HNBR rubber mixture;
wherein (i) when any one of the tension layer, first tape, second tape, or cushion layer is formed from its respective vulcanizable EPDM rubber mixture, then all of the tension layer, first tape, second tape, and cushion layer is formed from their respective vulcanizable EPDM rubber mixture; or (ii) when any one of the tension layer, first tape, second tape, or cushion layer is formed from its respective vulcanizable HNBR rubber mixture, then all of the tension layer, first tape, second tape, and cushion layer is formed from their respective vulcanizable HNBR rubber mixture;
wherein the un-vulcanized cushion layer forms a first side of the partially-complete un-vulcanized belt build and the un-vulcanized tension layer forms an opposite second side of the partially-complete un-vulcanized belt build, and in which the first and second sides are connected by opposite first and second edges of the partially-complete un-vulcanized belt build;
wrapping the partially-complete un-vulcanized belt build with a belt wrap so that the belt wrap completely covers the opposite first and second edges to thereby form a complete un-vulcanized belt build; and
vulcanizing the complete un-vulcanized belt build with temperature and pressure in a profile-forming mold such that the first un-vulcanized adhesive tape and the second un-vulcanized adhesive tape are at least partially intermixed within a contiguous vulcanized layer formed between the plurality of cords, and such that the tension layer and the cushion layer also are vulcanized, thereby forming a completed belt in which the first and second edges remain completely covered by the belt wrap.

2. The method of claim 1 further comprising fully wrapping the belt with the belt wrap prior to the vulcanizing the belt build.

3. The method of claim 1, wherein the belt is a toothed belt.

4. The method of claim 1, wherein the belt is a ribbed belt.

5. The method of claim 1, wherein the belt is a non-toothed and non-ribbed belt.

6. The method of claim 1, wherein the vulcanizing of the belt build includes:
heating to a temperature in range from 120° C. to 260° C., and
applying pressure in a range from 85 psig to 500 psig.

7. The method of claim 1, wherein the first un-vulcanized tape and the second un-vulcanized tape are devoid of carbon black.

8. The method of claim 1,
wherein the adhesive surface of the first un-vulcanized tape is on one side of the first tape, the first tape having another adhesive surface on a side opposite the one side, and
the adhesive surface of the second un-vulcanized tape is on one side of the second tape, the second tape having another adhesive surface on a side opposite the one side.

* * * * *